May 22, 1956 S. C. SCHIRO 2,746,146
CUTTING TOOL
Filed Jan. 13, 1954 2 Sheets-Sheet 1
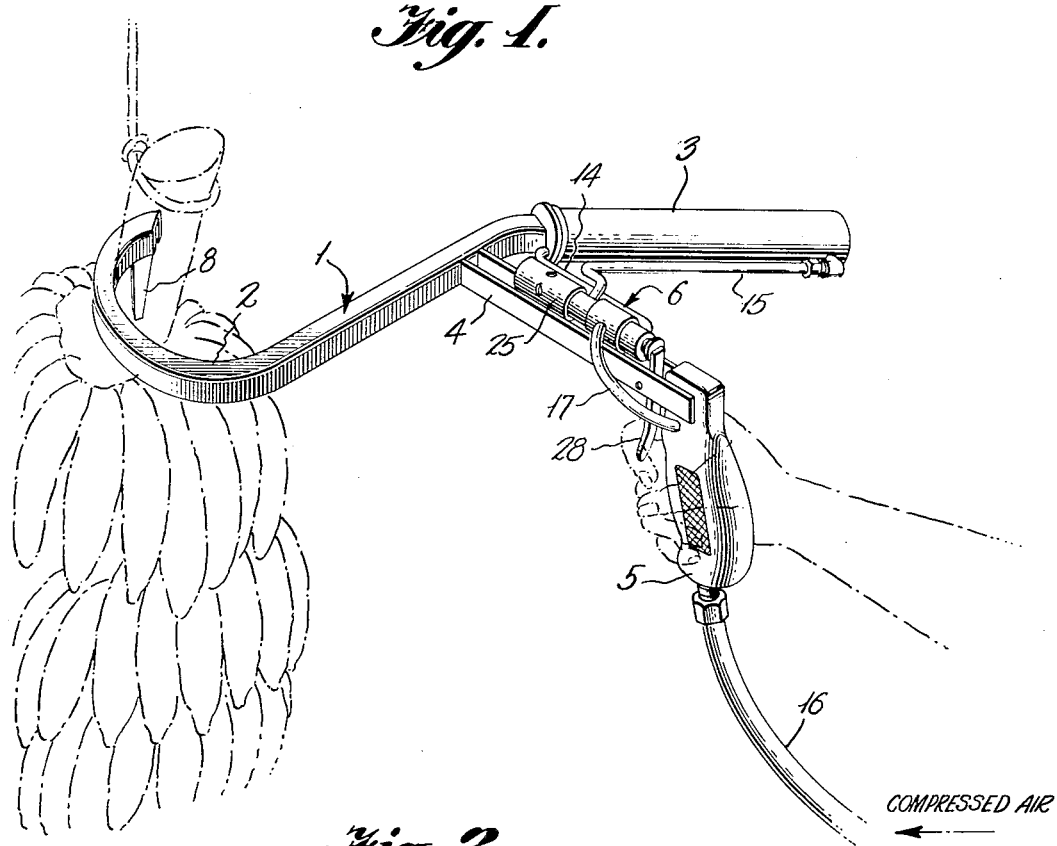
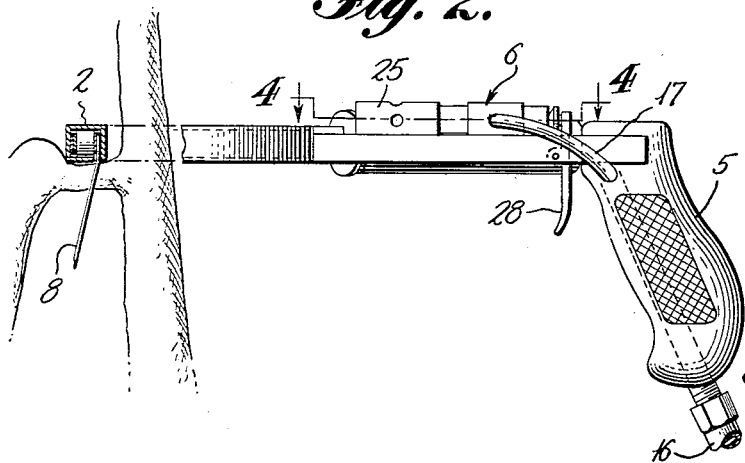
INVENTOR
Stephen C. Schiro
BY Mason, Fenwick & Lawrence
ATTORNEYS May 22, 1956　　　S. C. SCHIRO　　　2,746,146
CUTTING TOOL
Filed Jan. 13, 1954　　　2 Sheets-Sheet 2
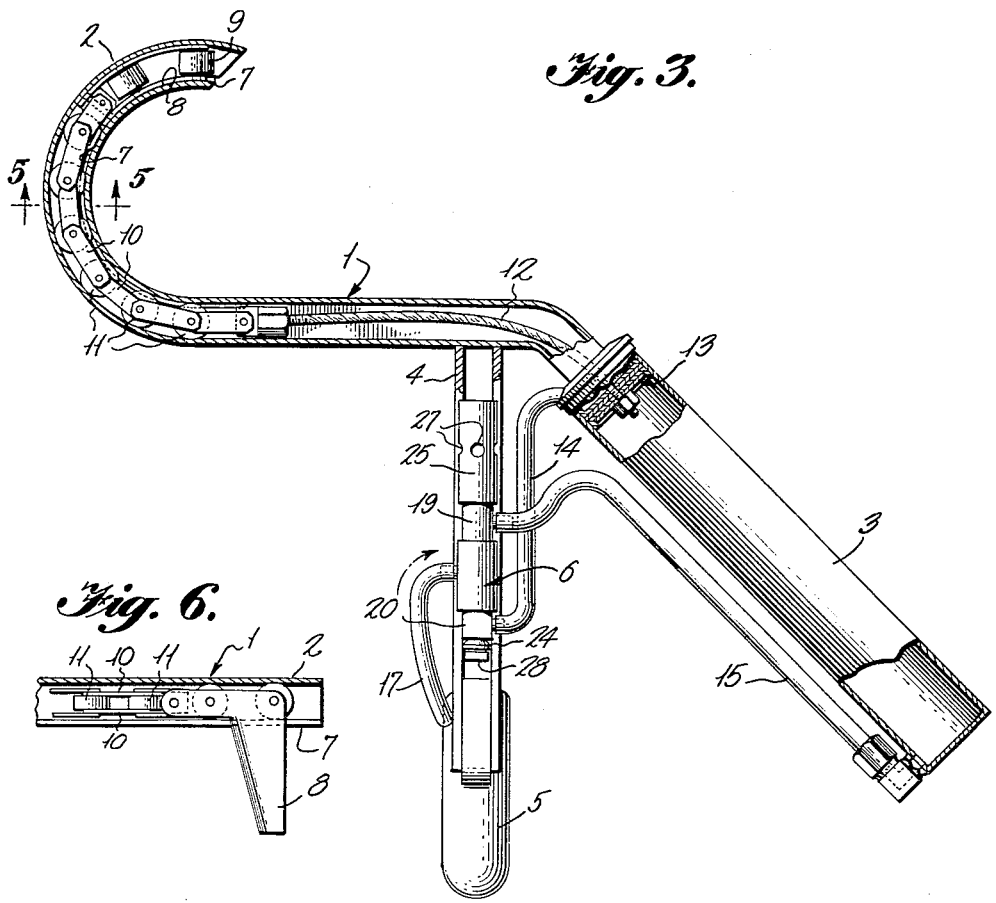
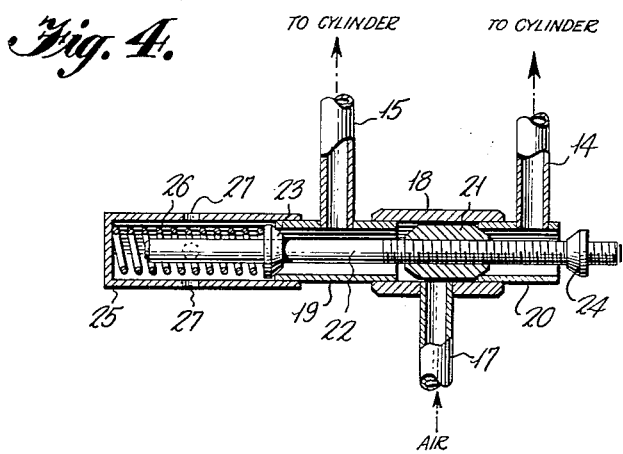
INVENTOR
Stephen C. Schiro
BY Mason, Fenwick & Lawrence
ATTORNEYS _United States Patent Office_ 2,746,146
Patented May 22, 1956

2,746,146

CUTTING TOOL

Stephen C. Schiro, Tampa, Fla.

Application January 13, 1954, Serial No. 403,893

8 Claims. (Cl. 30—272)

This invention relates to cutting devices particularly adapted to cut hands of bananas from a bunch.

It was formerly the custom in handling bananas to ship the bunches of bananas to the retail stores and the hands would be severed from the bunch and sold. This practice is no longer followed, but instead the hands are cut from the bunch and packed in containers for shipment to the retailers. In preparing the bananas for shipment the bunches are usually hung by the stalk by ropes from an overhead conveyor and transported to the cutters who, using a hand knife, cut the hands of bananas from the stalk and lay them aside for packing. In some instances the bunches are suspended in other ways, but up to the present time the cutting has been a hand operation. As the fibrous crown which connects the individual bananas to the stalk extends 180° around the stalk, it is necessary to make an arcuate cut to sever the hand from the stalk. Many times the cut will curve outwardly from the stalk before it completely severs the hand and will come so close to the individual bananas, or fingers, that they will drop from the hand, thus depreciating the value of the fruit. In other instances the speed with which the cutting is done causes the knife to cut into the bananas of the hand below the hand being cut and as it is a clean cut, it is unnoticed by the workman. In a short time, however, the edges of the cut open and turn brown, and the fruit begins to spoil.

Banana cutting is a highly skilled operation and it usually requires about 6 months to train an operator. Some means for accurately severing the hand from the bunch by an arcuate cut close to the stem by which damage to the fruit could be eliminated has long been sought in the industry.

The object of the present invention is to provide a cutting device which will quickly sever the hand from the bunch by a cut which is substantially medial of the crown and which can be used by a relatively unskilled operator without damage to the fruit.

Another object of the invention is to provide a device of this nature which is power operated and makes the prescribed cut without guidance by the operator.

Another object is the provision of a cutting device which can be manipulated by one hand so that the operator will have his other hand free to grasp the hands of bananas being severed so that they will not drop.

A still further object is the provision of a device of this character which when placed about the stalk of the bunch to cut off the first hand need not be removed until all of the hands have been severed from the stalk.

Other objects of the invention will become apparent from the following description of one practical embodiment thereof, when taken in conjunction with the drawings which accompany, and form part of, this specification.

In the drawings:

Figure 1 is a perspective view of a cutting tool embodying the principles of the present invention, shown in position for cutting the top hand from a bunch of bananas, the bunch being shown by dotted lines;

Figure 2 is an end elevation of the tool shown in Figure 1, parts being broken away in section;

Figure 3 is a top plan view of the tool with the blade guide and housing for the blade operator being shown in section;

Figure 4 is a longitudinal section through the valve controlling the compressed air supply, and is taken on the line 4—4 of Figure 2;

Figure 5 is a detailed section through the blade operator housing and guide taken on the line 5—5 of Figure 3; and, Figure 6 is a detailed showing of the blade mounted upon the end of the chain operator.

In general, the invention is in the form of a hand tool including a movable knife blade and an arcuate track to guide the movement of the blade and house the operator member for the blade. The housing and guide form a crook to encircle the banana stalk to position the blade, and the tool is manipulated and controlled by a pistol grip which projects from the housing member. The blade is caused to move by compressed air.

Referring to the drawings in detail, a housing 1 substantially rectangular in cross section, is arcuately bent at its free end to form a stalk-encircling crook 2. The opposite end of the housing is connected to a pneumatic cylinder 3 which is the actuating member of the tool. The cylinder may be in alignment with the straight portion of the housing, but is shown as positioned at an angle thereto to decrease the overall size of the tool and eliminate projecting members. A valve-supporting member 4 extends perpendicularly from the straight portion of the housing and carries at its end the pistol grip 5. The pneumatic control valve 6 is mounted on the supporting member 4 between the housing and the pistol grip.

The crook end of the housing is provided with a slot 7 which extends completely around the arcuate section and slightly into the straight portion and is adjacent to and concentric with the inner wall of the housing. This slot forms a guide track for the knife blade 8 which projects downwardly through the housing. The upper end of the knife is connected to the end link 9 of a flexible chain 10 which is mounted within the housing. Rollers 11 are mounted upon the connecting pins for the links of the chain to ride upon the walls of the housing and facilitate movement of the chain through the housing. The end of the chain is connected by means of a flexible wire or cable 12 to the piston 13 in the pneumatic cylinder 3. Thus, when the piston moves downwardly in the cylinder the chain will be drawn around the crook in a counter-clockwise direction, as viewed in Figure 3, and the knife will swing a full 180° following the guide slot 7. When the piston is forced upwardly in the cylinder the knife will be moved back to its starting postion.

The piston is moved within the cylinder by compressed air supplied through the air lines 14 and 15 connected respectively to the top and bottom of the cylinder and at their opposite ends to the control valve 6. Air is supplied to the control valve through a hose line 16 connected to the bottom of the pistol grip 5, and from this line the air flows to the control valve by means of the line 17.

The control valve is designed to place either of the lines 14 or 15 in communication with the air line 17, while the other line is permitted to exhaust to atmosphere. A valve for this purpose is shown in detail in Figure 4. The valve is generally cylindrical in form, and is shown as composed of a plurality of cylindrical sections threaded, or otherwise secured, together. The central section 18 has the air line 17 connected into an opening in its side and tubular sections 19 and 20 fitted into its ends. Tubular section 19 carries the pipe 15 and section 20 carries the pipe 14. Sections 19 and 20 are of smaller diameter than central section 18 and their ends within the section 18 form seats for a double valve 21. Valve 21 is mounted upon a valve stem 22 and is movable axially of the section 18 to cut off communication between the supply line 17 and the line 15, or between the supply line 17 and the line 14 at the will of the operator. Additional valves 23 and 24 are mounted upon the valve stem to seat against the outer ends of the respective sections 19 and 20. These valve members 23 and 24 are so spaced from the double valve 21 that when the valve 21 is seated against the end of the housing section 20, valve 23 will be seated against the outer end of the housing section 19 so that air supply line 17 will be in communication with the line 15. At the same time valve member 24 will be moved from its seat against the outer end of the section 20 so that air line 14 may exhaust to atmosphere. When the valve stem is moved in the opposite direction, valve 21 seats against the housing section 19 and valve 24 seats against the housing section 20. This places the air supply line 17 in communication with the line 14 and line 15 is permitted to exhaust. A cap member 25 is secured over the end of the housing section 19 and its end forms a seat for a coil spring 26 which surrounds the valve stem and bears against the valve 23. This will cause the valve stem to be biased in the direction to connect the air line 15 with the air supply and thereby move the piston 13 to the top of the cylinder 3 and the knife blade to its initial position. The cap member 25 is provided with a plurality of openings 27 to permit line 15 to exhaust when valve 23 is open. Valve stem 22 projects beyond the end of the valve housing in the direction of the pistol grip 5. A trigger 28 is pivotally connected to the valve support in front of the pistol grip and has its upper end in contact with the end of the valve stem 22. When the operator grasps the tool and pulls backward on the trigger, the valve stem will be moved against the tension of the spring 26 to put air supply line 17 in communication with the line 14 to force the piston downward in the cylinder and cause the knife to make its cutting movement. As soon as the trigger is released, spring 26 will cause the valve to move to its normal position, causing return of the knife to its position of rest.

In using the device the crook at the end of the housing will be hooked around the top of the stalk with the free end of the crook close to the stalk. The crook will then be slid downwardly until it rests upon the crown of the top hand of bananas and turned until the knife blade is against the edge of the crown. By pulling the trigger the knife will be caused to move around its guide track and sever the hand from the stalk. Due to the fact that the banana stalk tapers from end to end, it is necessary to design the crook on a radius larger than the radius of the banana stalk so that it may be moved freely along the stalk. It has been found by experiment that if the crook is placed so that the knife blade is close to the stalk while in its initial position that the blade in cutting through the crown and moving around its track will pull the crook against the stalk so that the path of the knife is close to the stalk. This movement is automatic and it is not necessary for the operator to guide it in any way. Due to the fact that the hands of bananas grow spirally around the stalk, it is simply necessary to slide the crook down the stalk after severing one hand and rotate the stalk slightly to bring the knife blade against the side of the crown of the next hand. It is necessary that the knife blade be in this position at the start of the cut as the crown has an angular extent of 180° and the travel of the knife can be but slightly more than 180° without unduly closing the open end of the crook.

While in the above one practical embodiment of the invention has been disclosed, it will be apparent that the structure shown and described is merely by way of example and that various changes may be made from the precise details shown without departing from the scope of the invention as defined in the appended claims.

What is claimed is:

1. In a cutting tool, an elongated housing member formed into a crook at one end and having a guide slot along at least the crook position thereof, a knife movable in said guide slot and projecting beyond said housing at an angle to the plane of the crook, a flexible operator in said housing connected to said knife, and means connected to said operator to move it to cause said knife to traverse said guide slot.

2. In a cutting tool as claimed in claim 1, said means connected to said operator comprising a pneumatic cylinder and piston assembly.

3. In a cutting tool as claimed in claim 1, a hand grip connected to said housing.

4. In a cutting tool as claimed in claim 1, said means connected to said operator comprising a pneumatic cylinder and piston assembly, a valve for controlling said cylinder having means for coupling to a source of compressed air, a hand grip connected to said housing and a control for said valve positioned adjacent said hand grip.

5. In a cutting tool, a guide member at least a part of which is arcuate, a knife mounted in said guide and projecting therefrom at an angle to the arcuate plane of the guide, a hand grip projecting from said guide, and means to cause said knife to traverse said guide.

6. In a cutting tool as claimed in claim 5, said means to cause traversing movement of said knife comprising a valve-controlled pneumatic cylinder and piston assembly.

7. In a tool for cutting hands of bananas from a bunch, a housing having a banana stalk encircling crook at its free end, said housing having a guide slot around the crook portion thereof, a knife projecting downwardly from the housing through said slot, a flexible operator in said housing having one end connected to said knife, means to move said operator connected to the opposite end thereof, and a hand grip projecting from said housing.

8. In a cutting tool as claimed in claim 7, said means to move said knife comprising a pneumatic cylinder and piston assembly, a valve to control said assembly, means to bias said valve in one position, and means to move said valve to another position.

References Cited in the file of this patent

UNITED STATES PATENTS

| | | |
|---|---|---|
| 569,366 | Wilkin | Oct. 13, 1896 |
| 734,285 | Thomann | July 21, 1903 |
| 1,522,638 | Liebknecht | Jan. 13, 1925 |
| 2,629,928 | Moravcik | Mar. 3, 1953 |